US 6,705,276 B1

(12) United States Patent
Sun et al.

(10) Patent No.: US 6,705,276 B1
(45) Date of Patent: Mar. 16, 2004

(54) COMBUSTION MODE CONTROL FOR A DIRECT INJECTION SPARK IGNITION (DISI) INTERNAL COMBUSTION ENGINE

(75) Inventors: Jing Sun, Bloomfield, MI (US); Ilya V. Kolmanovsky, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/278,473

(22) Filed: Oct. 24, 2002

(51) Int. Cl.$^7$ ............................................... F02B 17/00
(52) U.S. Cl. ................................ 123/295; 123/406.23
(58) Field of Search ................................ 123/295, 305, 123/443, 436, 406.23, 406.24, 406.35; 701/103, 115

(56) References Cited

U.S. PATENT DOCUMENTS

| | | | |
|---|---|---|---|
| 5,755,198 A | | 5/1998 | Grob et al. |
| 6,026,779 A | * | 2/2000 | Obata et al. ................. 123/295 |
| 6,234,139 B1 | * | 5/2001 | Taga et al. .................. 123/295 |
| 6,321,714 B1 | | 11/2001 | Grizzle et al. |
| 6,371,076 B1 | | 4/2002 | Kamijo et al. |
| 6,378,484 B1 | * | 4/2002 | Russell et al. ............... 123/295 |
| 6,386,174 B1 | | 5/2002 | Volz et al. |
| 6,390,055 B1 | | 5/2002 | Sivashankar et al. |
| 6,564,769 B2 | * | 5/2003 | Kolmanovsky et al. ..... 123/295 |
| 6,631,704 B2 | * | 10/2003 | Ogawa et al. ............... 123/295 |

* cited by examiner

Primary Examiner—Mahmoud Gimie
Assistant Examiner—Hai Huynh
(74) Attorney, Agent, or Firm—Julia Voutyras

(57) ABSTRACT

A method and system for controlling internal combustion engine, such engine being adapted to operate in a selected one of a plurality of operating mode. One of such modes is characterized by stratified combustion and another one of such modes is characterized by a homogeneous combustion. The method and system includes determining from operating conditions of the engine and a demanded torque, a preferred one of the operating modes. Determining from such demanded torque whether operation such preferred operating mode is feasible. The method and system effects a transition of the engine to the preferred mode if such preferred mode is determined to be feasible; otherwise, such engine is operated in one of the modes which provides the minimum difference between the torque produced in such one of the modes and the demanded torque. The feasibility determining comprises determining maximum torque, $\tau_{max,s}$, producible by such engine in the stratified operating mode and determining minimum torque, $\tau_{min,h}$, producible by such engine in the homogeneous operating mode. The stratified mode is determined feasible if the demanded torque is less than the determined maximum torque, $\tau_{max,s}$, and the homogeneous mode is determined feasible if the demanded torque is greater than or equal to the determined minimum torque, $\tau_{min,h}$. Maximum torque, $\tau_{max,s}$, is determined as a function of engine operating speed, air charge and burned gas fraction in a cylinder of such engine and a lower limit of the air fuel ratio for stratified operation of such engine. Minimum torque, $\tau_{min,h}$, is determined as a function of engine operating speed, air charge in a cylinder of such engine, an upper limit of the air fuel ratio for homogeneous operation of such engine, burned gas fraction in the cylinder, and maximum delayed ignition timing from Maximum Brake Torque spark timing Spark timing is changed to meet demanded torque when operating in the homogeneous mode, and changing fuel flow to such cylinder when operating in the stratified mode.

18 Claims, 8 Drawing Sheets

US 6,705,276 B1

COMBUSTION MODE CONTROL FOR A DIRECT INJECTION SPARK IGNITION (DISI) INTERNAL COMBUSTION ENGINE

TECHNICAL FIELD

This invention relates generally to a system and method for controlling a direct injection spark ignition internal combustion engine.

BACKGROUND

Direct injection spark ignition (DISI) internal combustion engines may be operated in various modes depending upon the particular objectives to be attained at any particular time with emphasis on power output, fuel economy, and/or low emissions, for example. Operating modes may include a homogeneous mode in which the combustion chambers contain a substantially homogeneous mixture of air and fuel, or a stratified mode in which the combustion chamberers contain stratified layers of different air/fuel mixtures. Stratified mode generally includes strata containing a stoichiometric air/fuel mixture nearer the spark plug with outer strata containing progressively leaner air/fuel mixtures.

Typically, there is a range of air/fuel ratios within which stable combustion can be achieved in the stratified mode, such as between 25:1 and 40:1, and a second range in which stable combustion can be achieved in the homogeneous mode, such as between 12:1 and 20:1. As such, there is typically a significant gap between the leanest air/fuel ratio of the homogeneous mode (20 in this example), and the richest air/fuel ratio of the stratified mode (25 in this example). This gap poses a number of problems in selecting an appropriate operating mode and controlling the engine. For example, best fuel economy is often associated with highest allowable manifold pressure which may dictate an air/fuel ratio which falls within the gap and is therefore not achievable in either mode of operation. As such, the engine controller operates the engine at a richer air/fuel ratio to maintain stable combustion with a resulting lower fuel economy. It also represents a challenge during mode switch when the transient manifold pressure and air charge in-cylinder reach conditions which prevent the engine from producing exactly the demanded torque without violating air-fuel ratio constraints.

SUMMARY

In accordance with the present invention, a method and system is provided for controlling an internal combustion engine, such engine being adapted to operate in a selected one of a plurality of operating mode. One of such modes is characterized by stratified combustion and another one of such modes is characterized by a homogeneous combustion. The method and system include determining, from operating conditions of the engine and a demanded torque, a preferred one of the operating modes. A determination is made from such demanded torque whether operation such preferred operating mode is feasible. If such preferred mode is determined to be feasible, the engine transitions to the preferred mode; otherwise, such engine is operated in one of the modes which provides the minimum difference between the torque produced in such one of the modes and the demanded torque.

In one embodiment, the feasibility determining comprises determining maximum torque, $\tau_{max,s}$, producible by such engine in the stratified operating mode and determining minimum torque, $\tau_{min,h}$, producible by such engine in the homogeneous operating mode. The method and system determine that operation of the engine is feasible in the stratified mode if the demanded torque is less than or equal to the determined maximum torque, $\tau_{max,s}$, and determine that operation of the engine is feasible in the homogeneous mode if the demanded torque is greater than or equal to the determined minimum torque, $\tau_{min,h}$.

In one embodiment, maximum torque, $\tau_{max,s}$, is determined as a function of engine operating speed, air charge, burned gas fraction in a cylinder of such engine and a lower limit of the air fuel ratio for stratified operation of such engine.

In one embodiment, minimum torque, $\tau_{min,h}$, is determined as a function of engine operating speed, air charge in a cylinder of such engine, an upper limit of the air fuel ratio for homogeneous operation of such engine, burned gas fraction in the cylinder, and maximum delayed ignition timing from Maximum Brake Torque spark timing. In one embodiment, spark timing is changed to meet demanded torque when operating in the homogeneous mode and changing fuel flow to such cylinder to meet torque demand when operating in the stratified mode.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
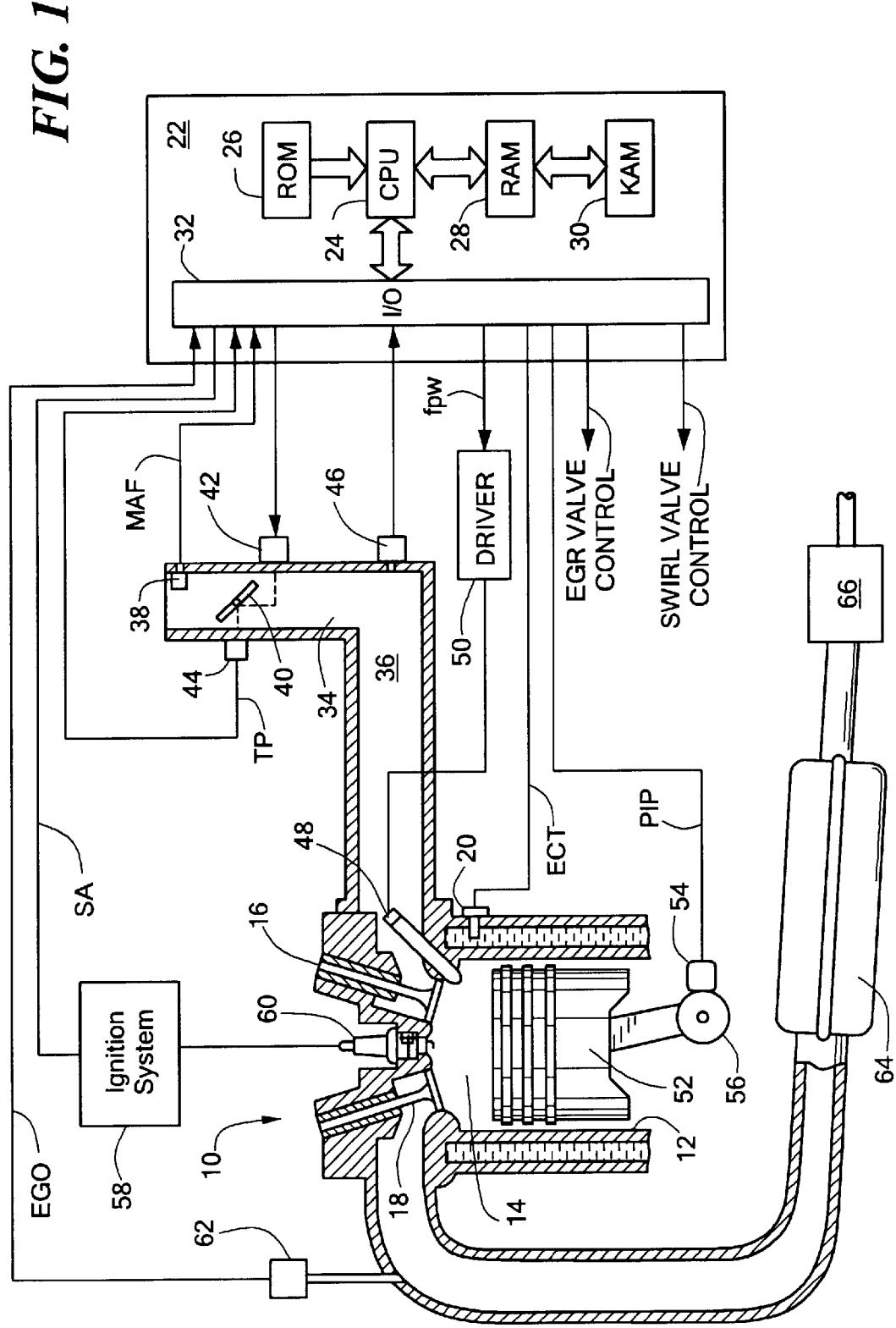
FIG. 1 is a DISI engine system according to the invention.

A block diagram illustrating an engine control system for a DISI engine according to the present invention is shown in FIG. 1. System 10 is preferably an internal combustion engine having a plurality of cylinders, represented by cylinder 12, having corresponding combustion chambers 14. As one of ordinary skill in the art will appreciate, system 10 includes various sensors and actuators to effect control of the engine. One or more sensors or actuators may be provided for each cylinder 12, or a single sensor or actuator may be provided for the engine. For example, each cylinder 12 may include four actuators which operate the intake valves 16 and exhaust valves 18.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. The computer-readable storage media may be implemented using any of a number of known memory devices such as PROMs, EPROMs, EEPROMs, flash memory, or any other electric, magnetic, or optical memory capable of storing data used by microprocessor (CPU) 24 in controlling the engine. Microprocessor 24 communicates with the various sensors and actuators via an input/output (I/O) interface 32.

In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 22 indicative of the mass airflow. A throttle valve 40 is used to modulate the airflow through intake 34. Throttle valve 40 is here, for example, electronically controlled by an appropriate actuator 42 based on a corresponding throttle position signal generated by controller 22. A throttle position sensor 44 provides a feedback signal (TP) indicative of the actual position of throttle valve 40 to controller 22 to implement closed loop control of throttle valve 40.

A manifold absolute pressure sensor 46 is used to provide a signal (MAP) indicative of the manifold pressure to controller 22. Air passing through intake manifold 36 enters combustion chamber 14 through appropriate control of one or more intake valves 16. Intake valves 16 and exhaust valves 18 may be controlled by controller 22 for variable cam timing applications. Alternatively, intake valves 16 and exhaust valves 18 may be controlled using a conventional camshaft arrangement. A fuel injector 48 injects an appropriate quantity of fuel in one or more injection events for the current operating mode based on a signal (FPW) generated by controller 22 and processed by driver 50.

As illustrated in FIG. 1, fuel injector 48 injects an appropriate quantity of fuel in one or more injections directly into combustion chamber 14. Control of the fuel injection events is generally based on the position of piston 52 within cylinder 12. Crank position information is provided by an appropriate sensor 54, which provides a position indication signal (PIP) indicative of rotational position of crankshaft 56.

The operating mode of each cylinder or group (portion) of cylinders may be based on the current operating conditions to obtain a desired value for an engine operating parameter, such as torque. As such, each cylinder 12 may be operated in homogeneous mode such that a substantially homogeneous mixture of air and fuel exists within combustion chamber 14, or in stratified mode in which combustion chamber 14 includes various strata having different air/fuel mixtures or ratios. At the appropriate time during the combustion cycle, controller 22 generates a spark signal (SA), which is processed by ignition system 58 to control spark plug 60 and initiate combustion within chamber 14. Controller 22 (or a conventional camshaft) controls one or more exhaust valves 18 to exhaust the combusted air/fuel mixture through an exhaust manifold. An exhaust gas oxygen sensor 62 provides a signal (EGO) indicative of the stoichiometry of the content of the exhaust gases to controller 22. This signal may be used to adjust the air/fuel ratio, or control the operating mode of one or more cylinders. The exhaust gas is passed through the exhaust manifold and through a catalytic converter 64 and $NO_x$ trap 66 before being exhausted to atmosphere. It should be understood that the engine includes exhaust gas recirculation (EGR) with an EGR valve, FIG. 1B, and a swirl control valve, not shown, or other charge motion device, such as cam profile switching (CPS). The swirl control valve, also known as a secondary throttle valve is positioned in the intake manifold runner proximate the intake valve 16. The swirl control valve imparts high swirling motion to the air charge entering each cylinder. This swirling motion continues through the induction, compression, and expansion stroke of the engine and promotes fast burn combustion, thereby improving fuel economy and emissions. The EGR valve and swirl control valve are controlled by signals produced by the controller 22 in a manner to be described.

Figure 1A:
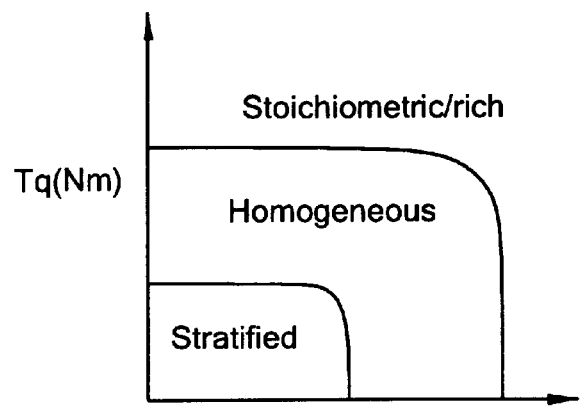
FIG. 1A shows the desired combustion modes for the engine of FIG. 1 as a function of engine speed and engine torque.
Figure 1B:
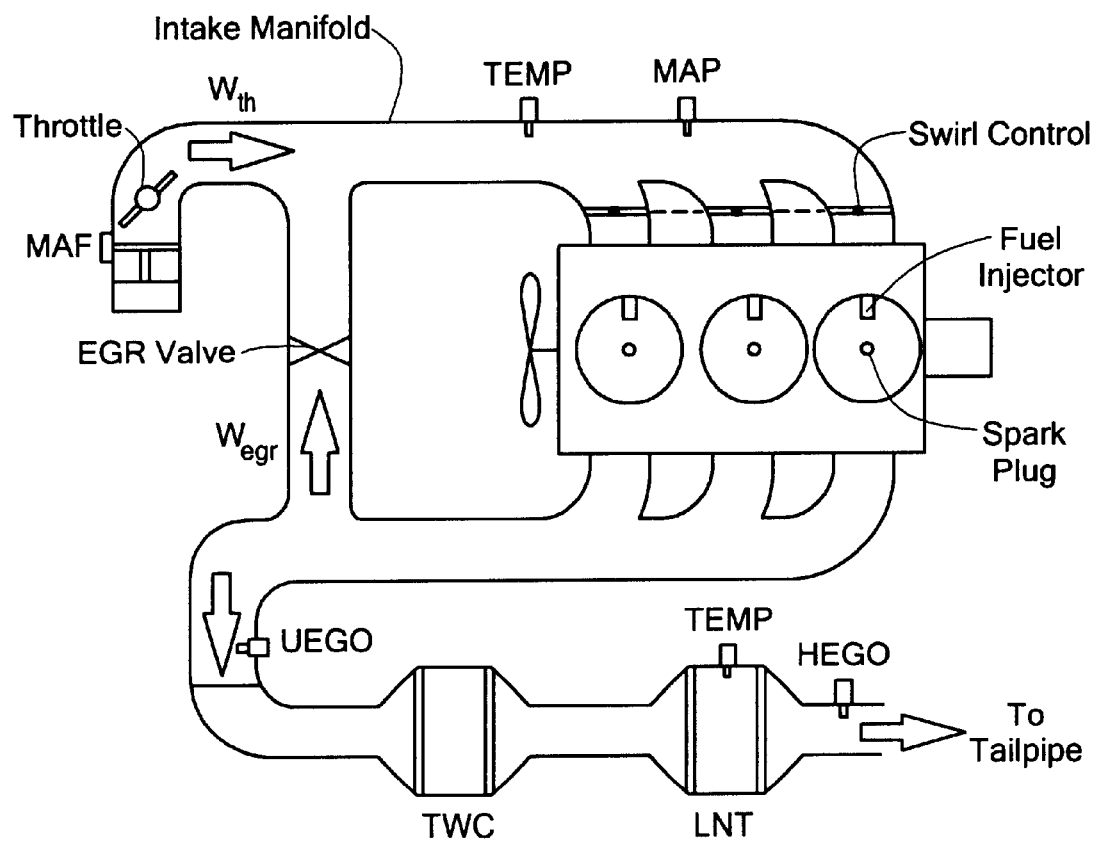
FIG. 1B is a diagram of the engine used in the engine system of FIG. 1.

The direct injection spark ignition engine of FIG. 1 may generally be operated in at least two modes of operation: homogeneous, and stratified. FIG. 1A shows the normal combustion modes for the engine of FIG. 1 as a function of engine speed, N, and engine torque, $T_q$. The feasible combustion mode is defined as the mode (or modes) that can meet the torque demand while satisfying stable combustion conditions. The feasible combustion mode determination provides candidates for the operational mode selection. During certain period in the transition phase, the desired mode may not be feasible due to the intake dynamics and other conditions that prevent it from being selected as the operating mode. One important function of the mode switch control operation, or mode transition algorithm, programmed into the ROM 26 of controller 22 is to determine when the desired mode becomes feasible. The program will be described in more detail below. A flow diagram of such program will be described in connection with FIGS. 6A and 6B. Suffice it to say here, however, that the mode transition algorithm effects seamless transitions between different operating modes for DISI engines. The control scheme coordinates all the actuators by:

(1) checking the in-cylinder condition characterized by charge quantity, burnt gas fraction and swirl intensity;

(2) determining the feasible combustion mode (or modes) based on the in-cylinder condition;

(3) determining the best timing for the mode switch; and (4) prioritizing the actuators (fueling, spark, ETC) to minimize fuel consumption and NOx emissions.

Figure 2:
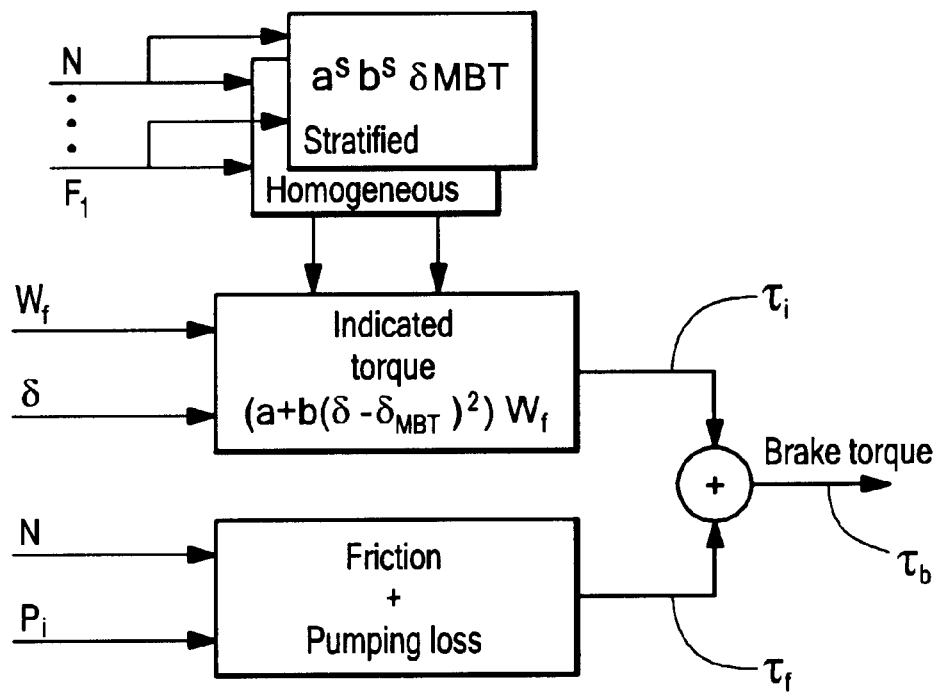
FIG. 2 is a torque model of the DISI engine of FIG. 1.

Referring now to FIG. 2, the basic engine torque model structure is shown. The brake torque is decomposed into a sum of two components: the indicated torque and friction loss. While the friction loss, which includes both the pumping loss and mechanical friction, is primarily a function of engine speed and manifold pressure, the indicated torque model is more complicated and has different characteristics in different combustion modes. Based on the analysis of engine mapping data, the following torque model was developed:

$$\tau_b = \tau_i + \tau_f \quad (1)$$

where:

$\tau_b$ is break torque;

$\tau_i$ is indicated torque; and $\tau_f$ is friction torque and pumping loss=$f_0(N,\sigma)+f_1(N, \sigma)P_i$
where $f_0$ and $f_1$ are different functional relationships that depend on engine design; N is engine speed, σ is swirl control vale position; and $P_i$ is intake manifold pressure.

For operation in a stratified engine operating mode:

$$\tau_i = (a^s(N,P_i,P_f,F_i,r_c,\sigma,t_i) + b^s(N,P_i,F_i,\sigma)(\delta-\delta_M)^2)W_f \quad (2)$$

where:

$a^s$ and $b^s$ are functions of engine operating variables whose coefficients can be identified from a priori determined stratified engine mapping data;

$P_f$ is fuel rail pressure;

$F_i$ is burned gas fraction;

$r_c$ is in-cylinder air-to-fuel ratio (AFR);

σ is swirl control valve position;

$t_i$ is fuel injection timing;

δ is spark timing;

$\delta_M$ is the spark timing corresponding to the maximum brake engine torque (also called MBT spark); and $W_f$ is fueling rate.

For operation in a homogeneous engine operating mode:

$$\tau_i = (a^h(N,P_i,r_c) + b^h(N,P_i,r_c,F_i,\sigma)(\delta-\delta_M)^2)W_f \quad (3)$$

where:

$a^h$ and $b^h$ are functions of engine operating variables whose coefficients can be identified from a priori determined homogeneous engine mapping data.

The correlation of the maximum break torque (MBT) spark timing to engine control variables is also established through the regression of engine mapping data, and is given as:

For a engine operating in the stratified operating mode:

$$\delta_{MBT} = c^s(t_i,r_c,N,F_i,P_i,\sigma)$$

and, for an engine operating in the homogeneous operating mode;

$$\delta_{MBT} = c^h(F_i,r_c,N,P_i)$$

where:

$c^s$ and $c^h$ are functions of engine operating variables that can be identified from engine mapping data for a particular engine design.

To accommodate for the on-board requirements of computational speed and storage memory, the full-scale torque model (equations (2) and (3)) is simplified when it is used for the real-time control. Since the air-to-fuel ratio and fueling rate are not independent variables for fixed in-cylinder conditions, the following simplified model structure is adopted for on-board control implementation:

For the stratified operating mode:

$$\tau_i = (a_0^s(N,\sigma)r_c + a_1^s(N,\sigma) + (b_0^s(N,F_i)r_c + b_1^s(N,F_i))(\delta - \quad (4)$$

$$\delta_{MBT})^2)W_f$$

$$= a_0^s(N,\sigma)W_{acyl} + a_1^s(N,\sigma)W_f + (b_0^s(N,F_i)W_{acyl} +$$

$$b_1^s(N,F_i)W_f)(\delta - \delta_{MBT})^2$$

where:

$w_{acyl}$ is cylinder air charge quantity (excluding the burnt gas).

For the homogeneous operating mode:

$$\tau_i = (a_0^h(N,\sigma)r_c + a_1^h(N,\sigma) + (b_0^h(N,F_i)r_c + b_1^h(N,F_i))(\delta - \quad (5)$$

$$\delta_{MBT})^2)W_f$$

$$= a_0^h(N,\sigma)W_{acyl} + a_1^h(N,\sigma)W_f + (b_0^h(N,F_i)W_{acyl} +$$

$$b_1^h(N,F_i)W_f)(\delta - \delta_{MBT})^2$$

If necessary, the functions a, b used to model indicated torque in homogeneous and stratified modes can be expanded to include their sensitivity to other variables such as intake manifold pressure and swirl control valve.

For a DISI engine to deliver the torque demanded by the driver and accessory loads while meeting the after-treatment system operating requirements, the control system has to actively coordinate all available control actuators, including fuel (quantity and timing), throttle, EGR, spark, etc. The key functions of the torque control feature include:

Scheduling: to determine: the optimal operating mode and throttle, EGR, manifold pressure setpoints for a given demanded torque, engine speed and after-treatment system status.

Estimation: to provide all necessary variables and signals for torque control.

Key variables include friction torque and pumping losses, MBT spark timing, and in-cylinder state (charge amount, charge composition, and charge motion).

Delivering: to command the fast actuators such as fuel and spark to meet instantaneous torque demand for given in-cylinder conditions.

Figure 3:
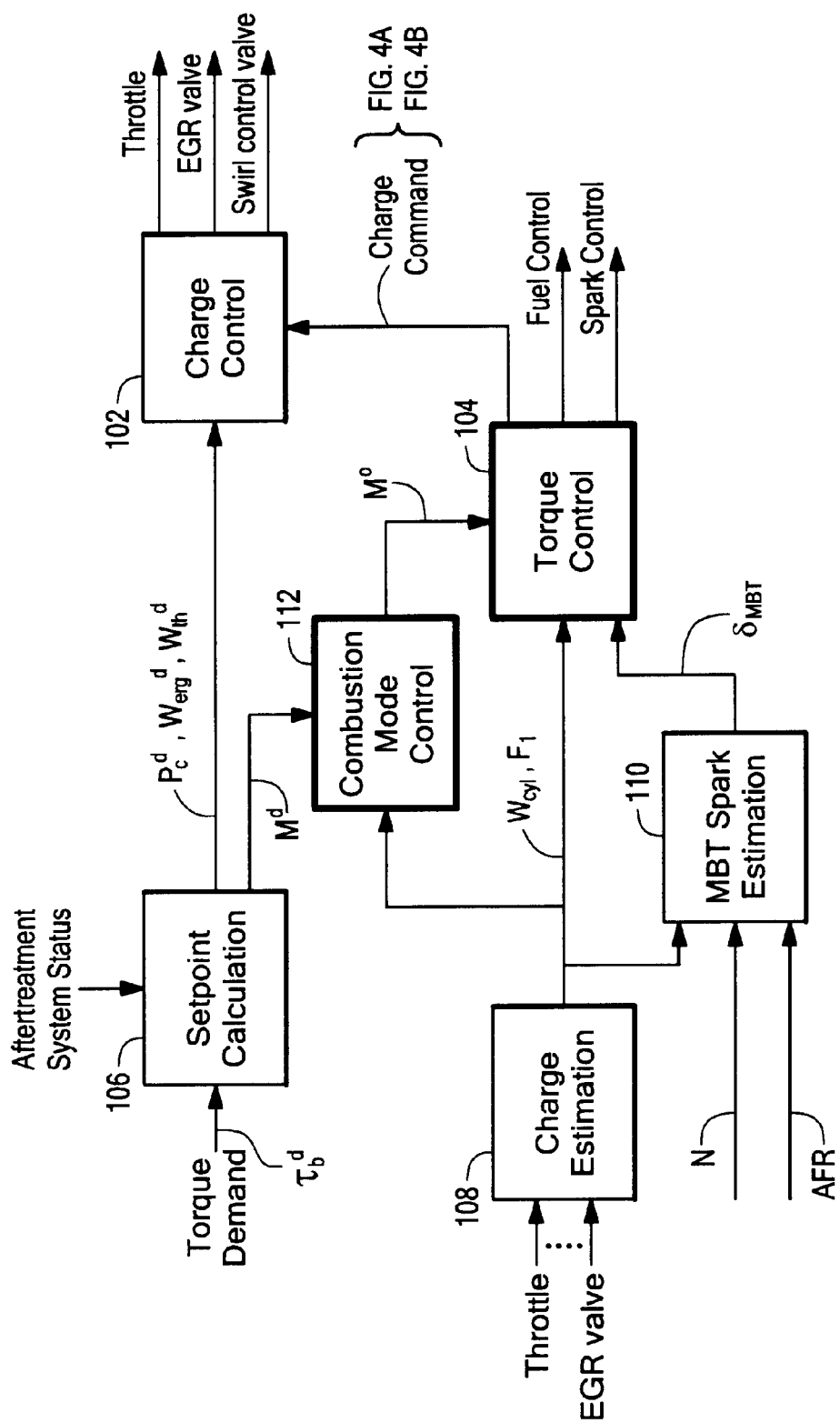
FIG. 3 is a diagram of a torque control system used in the engine of FIG 1.

Referring now to FIG. 3, a system 100 is shown for generation of the air charge control signals by charge control 102 (i.e., throttle plate position, exhaust gas recirculation (EGR) valve position, and swirl control valve position) as well as torque control signals by torque control 104 (i.e., fuel control, fpw, and spark control, SA) and a charge correction term, commanded charge (FIGS. 4A and 4B), when fuel and spark are not sufficient, as shown. As will be described in more detail below, setpoint calculations 106 are made, such setpoints being desired intake manifold pressure, $P^d_i$, desired cylinder charge quantity, $W^d_{cyl}$, desired burned gas fraction, $F^d_i$, and desired combustion mode, $M^d$. It should be understood that the desired EGR flow, $W^d_{erg}$, and the desired throttle flow, $W^d_{th}$, can be calculated from the desired cylinder flow, $W^d_{cyl}$, and the desired burned gas fraction, $F^d_i$. The calculations of $W^d_{erg}$ and $W^d_{th}$ are described in detail below.

An air charge estimation 108 is calculated from throttle plate position, EGR position signals and swirl control position signal, or other charge motion device signal. This charge estimation provides actual cylinder charge quantity, $W_{cyl}$, and burned gas fraction, $F_i$.

An MBT spark estimation 110 is fed by other inputs including measured engine speed, N and operating air-fuel ratio. The MBT spark estimation, $\delta_{MBT}$ is fed to the torque control 104.

A combustion mode control 112 is fed the actual cylinder charge quantity, $W_{cyl}$, and burned gas fraction, $F_i$ from the charge estimation 108 and the desired combustion mode $M^d$ from the setpoint calculation 106 to select the combustion operating mode $M^o$ in a manner to be described below in connection with FIGS. 6A and 6B. Suffice it to say here that in response to the selected combustion operating mode $M^o$ and the actual cylinder charge quantity, $W_{cyl}$, and burned gas fraction, $F_i$, provided by the charge estimation 108, and the MBT spark estimation, $\delta_{MBT}$, provided by the MBT spark estimation 110, the torque control 104 produces the fuel control signal, fpw, and spark control signal, SA in a manner to be described below in connection with FIGS. 6A and 6B.

Setpoint Calculation 106

The setpoints refer to the desired values of cylinder charge, burnt gas fraction, manifold pressure, etc., to meet desired torque demand while optimizing fuel economy and emissions. There are two types of setpoints:

the set-points of the first type are defined by the lookup tables that set the desired AFR, EGR rate, spark timing for a given speed and torque condition, these tables are optimized off-line and then stored in the memory of the controller 22 (FIG. 1); and the setpoints of the second type are calculated on-line by the controller 22 to determine the desired cylinder charge, burnt gas fraction and intake manifold pressure to achieve the desired AFR, EGR rate and other combustion conditions that will facilitate the optimal operation of the engine.

Given the demanded torque $\tau_b^d$ which is calculated based on driver's accelerator pedal input and other accessory load conditions, the demanded indicated torque is then determined as:

$$\tau_i^d = \tau_b^d - \hat{\tau}_f$$

where:

$\hat{\tau}_f$ is an estimate of friction and pumping losses (note that $\hat{\tau}_f$ is negative in value) that will be discussed below.

Let it be assumed that $r_c^d$, $F_i^d$, $\delta_0^d$, $\sigma^d$ are the desired values for in-cylinder air-to-fuel ratio, burnt gas fraction, spark deviation from MBT value (i.e., $\delta_0^d = \delta^d - \delta_{MBT}$), and swirl control valve position respectively. These values are determined from lookup tables stored in the controller 22 (FIG. 1) as functions of engine speed and torque determined by the off-line calibration process.

As noted above, the setpoint calculation 106 determines the desired combustion mode, $m^d$, here from a lookup table stored in the controller 22 (FIG. 1), which, in addition to engine speed and torque demand, also takes inputs from the after-treatment system software module in the controller 22 whose needs to service the LNT (i.e., purging of the LNT) may dictate the mode to be chosen. According to the torque equations (4), (5) above, we have:

$$\tau_i^d = (a(N, r_c^d) + b(N, F_i^d, r_c^d)(\delta_0^d))^2 W_f^d \qquad (6)$$

$$= (a(N, r_c^d) + b(N, F_i^d, r_c^d)(\delta_0^d))^2 \frac{W_{cyl}^d}{(1 - F_i^d)r_c^d}$$

From equation (6) above, one can solve for $W_{cyl}^d$ and therefore $W_{acyl}^d$. (It should be noted that: If the functions a, b in equation (6) also depend on the intake manifold pressure, $P_i$, then the volumetric efficiency relationship: $W_{cyl}^d = g_0(N, \sigma^d) + g_1(N, \sigma^d) P_i^d$ has to be used in conjunction with equation (6) above to determine the desired cylinder charge setpoint $W_{cyl}^d$), where $g_0$ and $g_1$ are a function of engine speed and position of the charge motion control device. These functions can be identified from the mapping data for a particular engine of interest. The terms a, b in the equation (6) above are selected according to the value $m^d$. Given $W_{cyl}^d$, one can calculate the desired EGR and throttle flows, respectively, as $$W_{erg}^d = \frac{F_i^d W_{cyl}^d (1 + r_{exh}^d)}{1 + r_{stoich}}$$

$$W_{th}^d = W_{cyl}^d - W_{erg}^d$$

where:

$r_{exh}$ is the exhaust air-to-fuel ratio; and $r_{stoich}$ is the stoichiometric air-to-fuel ratio value.

The values of $W_{egr}^d$, $W_{th}^d$, can then be communicated to the charge control 102 (FIG. 3) to effect the throttle, EGR, and swirl control valve positions that result in the desired charge conditions.

Air Charge Estimation 108

For effective torque control, the strategy relies on several key variables that have to be estimated on-line:

In-cylinder condition: This includes the in-cylinder charge, burnt gas fraction and charge motion. The algorithms for the in-cylinder charge and burnt gas fraction estimation have been addressed in many patents, e.g. (U.S. Pat. No. 6,311,679, Druzhimina et al, issued Nov. 6, 2001, entitled "System and Method of Controlling Air-Charge in Direct Injection Lean-Burn Engines", assigned to the same assignee as the present invention. For the charge motion, it can be correlated directly with the charge motion control actuator command. For many DISI engines, a swirl control valve in the intake port is used to effect different charge motion, therefore the charge motion is correlated directly with the position of the swirl control valve.

Friction and pumping losses: This can be estimated from the measurements of engine speed N and manifold pressure $P_i$ using equation (2). For on-board implementation, the offset $f_0$ and slope $f_1$ in equation (2) are replaced by two-dimensional lookup tables to save on-line computational time. The friction torque and pumping losses are independent of the combustion mode.

MBT Spark Estimation 110

A simplified version of the model is used to evaluate the MBT spark timing for each combustion event:

For the stratified mode of operation:

$$\delta_{MBT}^s = 7.57 + 0.19 t_f + 0.0193 N F_i$$

For the homogeneous mode of operation:

$$\delta_{MBT}^h = 9.95 + 0.0004 N r_c + 0.0036 N \sigma + 0.0464 N F_i$$

These functions will change for different engines, and they can be identified from engine mapping data.

Combustion Mode Control 112, and Torque Control 104

The system 100 (FIG. 3) must deliver the demanded torque. For the immediate subsequent combustion event, the in-cylinder conditions are now fixed and therefore all the slow control actuators, such as throttle, EGR valve, swirl control valve, fuel rail pressure, etc. have no effect on this combustion event, even though they can affect the future events. That leaves the spark and fuel as the only two fast controls to meet the instantaneous torque demand.

The appropriate fuel and spark commands can be calculated from:

$$\tau_i^d = a_0(N) W_{acyl} + a_1(N) W_f + (b_0(N, F_i) W_{acyl} + b_1(N, F_i) W_f)(\delta - \delta_{MBT})^2$$

where N is measured and $W_{acyl}$, $F_i$, $\delta_{MBT}$ are estimated variables. Whenever possible, it is desirable to operate at $\delta = \delta^d$ for best fuel economy and emission performance. Depending on the operating mode, it is possible and sometimes necessary for the spark to deviate from $\delta^d$ to meet torque demand, especially during transients. For different modes, the constrains and fuel/spark authority ranges are different thereby leading to different strategies:

Homogeneous stoichiometric—The stoichiometric mode refers to both stoichiometric and rich AFR operation. In this mode, the AFR is tightly constrained to maximize the catalyst efficiency. Hence fuel is used to meet the AFR control requirement. That leaves spark as the only fast actuator to meet instantaneous torque demand. While the throttle and EGR are commanded to meet the desired manifold pressure, cylinder charge, and burnt gas fraction setpoints, they can also be coordinated to affect the transient torque control performance for the future combustion events but not for the immediate one, FIG. 4B.

Stratified—For stratified operation, the constraint on AFR is not as tight as in the stoichiometric operation. This allows the fueling rate to be used as the primary control actuator for torque control during transient. On the other hand, spark has very little influence on the engine torque other than affecting the combustion stability (the spark sensitivity function for torque is almost flat within the stable combustion window. In this case, throttle is used primarily to achieve air-to-fuel ratio setpoint while fuel (with large control authority) is used to meet instantaneous torque demand, FIG. 4A.

Homogeneous lean—The homogeneous lean falls between the stratified and stoichiometric where both fuel and spark provide some authority in torque and AFR control.

Figure 4A:
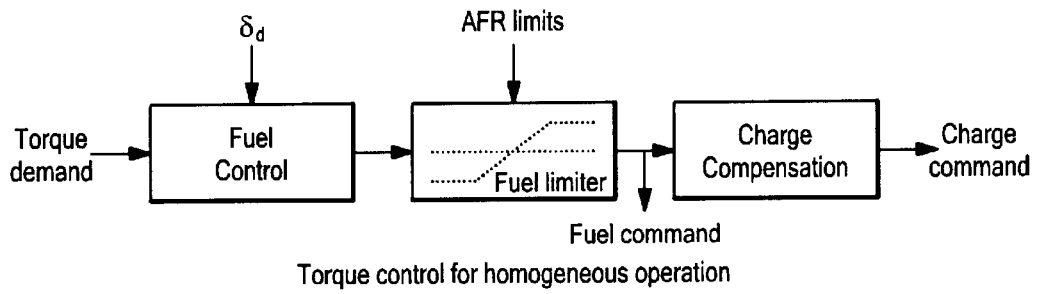
FIG. 4A is a torque control system used to control the DISI engine of FIG. 1 when such engine operates in a stratified operating mode.
Figure 4B:
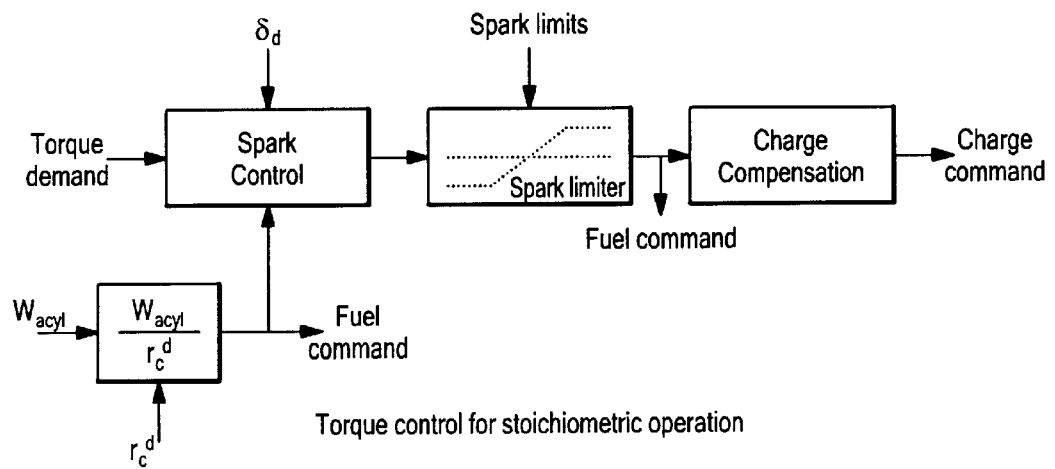
FIG. 4B is a torque control system used to control the DISI engine of FIG. 1 when such engine operates in a homogeneous stoichiometric operating mode.

FIGS. 4A and 4B shows the diagrams of torque control for different operating modes (i.e., stratified and homogeneous stoichiometric, respectively). As reflected in the diagrams, the main differences among these modes are in the control objective priority and control authority limitations.

Mode Switch Algorithm

The combustion mode switch, here provided by the mode control 112 in a manner to be described in more detail in connection with FIGS. 6A and 6B, on a DISI engine is very critical for all the important powertrain attributes, including fuel economy, emissions, and driveability. To execute an effective LNT purge and minimize the associated fuel penalty, it is required to make fast transitions between the homogeneous and stratified mode without causing noticeable torque disturbances. That requires a close coordination of all the involved actuators.

When the desired mode is changed from $m^d$ (old) to $M^d$ (new), the control system takes several steps to change the intake and in-cylinder conditions to effect a smooth transition:

1. The setpoints for cylinder charge, manifold pressure, and burned gas fraction are re-calculated by setpoint calculation 106 (FIG. 3) for $m^d$ (new). Throttle, EGR valve and swirl control valve positions are then changed by charge control 102 (FIG. 3) accordingly to achieve the new setpoints.

2. The current in-cylinder conditions are assessed to determine feasible combustion mode by combustion mode control 112 as will be described in more detail in connection with FIGS. 6A and 6B. If the new desired mode is feasible, the mode switch can be effected immediately. Otherwise, the mode switch will be postponed. Meanwhile, an appropriate operational mode will be chosen to minimize the torque disturbance. If $m^d$ (old) belongs to the feasible mode, it will be chosen as the intermediate operating mode to minimize torque disturbance and transition. In this case, this step has to be repeated until the intake manifold condition being changed so that $m^d$ (new) becomes feasible, 112 as will be described in more detail in connection with FIGS. 6A and 6B.

3. Once the combustion mode is chosen in step 2, fuel and spark are adjusted by the torque control 104, as will be described in more detail in connection with FIGS. 6A and 6B, to meet torque demand within their specified authority range.

The calculation for the setpoints (step 1) and the determination of fuel and spark to meet instantaneous torque demand (step 3) are discussed in above in connection with the setpoint calculation 106. Step 2 is crucial for the transient. performance, as it defines the moment at which the switch over takes place. If the switch occurs too early before intake and in-cylinder conditions become ready for the new combustion mode, it will lead to a rough transition and therefore cause driveability concerns. On the other hand, if the switch is overdue when the conditions are ready, it will extend the transition period and adversely affect performance. When the transition is necessitated by the LNT purge, miscalculated switch over time will also have serious negative fuel economy and emission implications. u The feasibility of a given combustion mode is determined by the intake and in-cylinder conditions together with the demanded torque value. If the intake manifold pressure is too high and the demanded torque is low, the homogeneous mode may be prohibited because the in-cylinder air-to-fuel ratio may be too lean to have a stable combustion. On the other hand, if the intake manifold pressure is too low and the torque demand is high, the stratified combustion will not be feasible because the air-to-fuel ratio required to meet the torque demand may be too low leading to smoke in the exhaust. Noting that homogeneous combustion is limited by the low torque requirements and stratified by the high torque requirements, the boundary conditions which define the feasible modes are characterized by the maximum stratified torque ($\tau_{max,s}$) and the minimum homogeneous torque ($\tau_{min,h}$) that can be generated at a given in-cylinder condition.

Figure 6A:
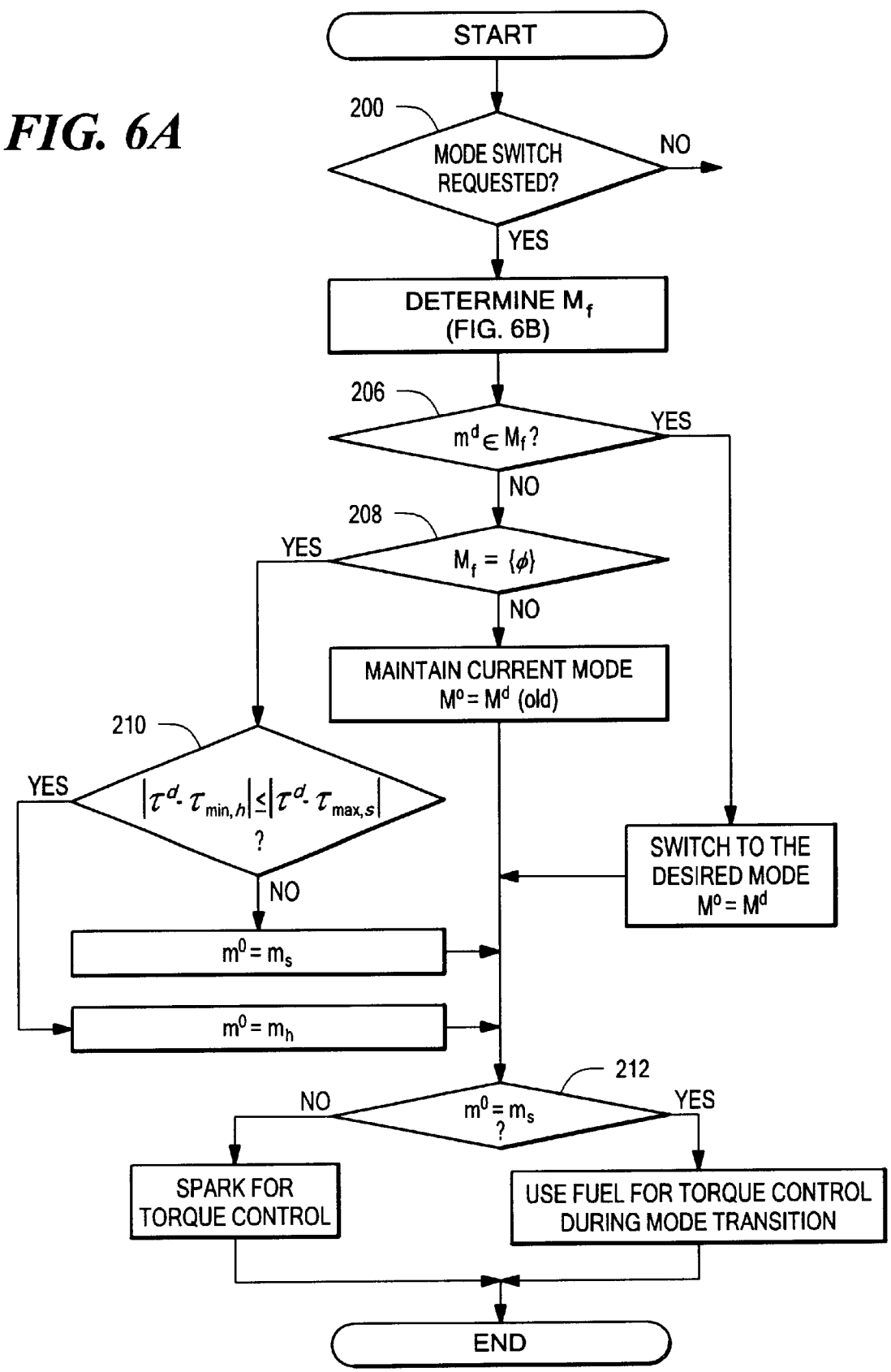
FIG. 6A is a flow diagram of the process used to switch combustion mode in accordance with the invention.

Referring now to FIG. 6A, when a combustion mode switch is requested by the engine management function (Step 200), a set of feasible operating modes, $M_f$ is determined. Such determination is shown with reference to FIG. 6B. At each sample time, $W_{acyl}$, $F_i$ are the updated cylinder air charge and burnt gas fraction respectively. Then $\tau_{max,s}$, $\tau_{min,h}$ are calculated as:

$$\tau_{max,s}=a_0^s(N)W_{acyl}+a_1^s(N)W_{acyl}/r_{c,min}^s \tau_{min,h}=a_0^h(N)W_{acyl}+a_1^s(N)W_{acyl}/r_{c,max}^h+(b_0^h(N,F)_i+b_1^h(N)W_{acyl}/r_{c,max}^h)\delta_{max,h}^2$$

where $r_{c,min}^s$ is the lower bound of the in-cylinder AFR for stratified operation, $r_{c,max}^h$ is the upper bound for homogeneous operation, and $\delta_{max,h}$ is the maximum spark retard (from Maximum Break Torque (MBT) spark) allowed in homogeneous operation. Here it is assumed that the maximum torque is achieved with (i.e., minimum AFR) and at MBT spark, while the minimum torque is achieved with minimum fuel (maximum AFR) and maximum spark retard (from MBT). It should be noted that this boundary condition is not fixed during the transition. It will change as the intake and in-cylinder conditions change.

For a given brake torque demand, $\tau^d$, the feasible mode to sustain a stable combustion is then determined by taking into account the pumping losses and friction effects as well as the boundary conditions for each mode:

$$m_s \in M_f \text{ if } \tau_i^d \leq \tau_{max,s},$$

$$m_h \in M_f \text{ if } \tau_i^d \geq \tau_{min,h},$$

where:

$$\tau_i^d = \tau^d - \hat{\tau}_f$$

and $M_f$ is a set of feasible modes. Depending on $\tau_i^d$ and its relation with $\tau_{max,s}$, $\tau_{min,h}$ there are three possible scenarios for a DISI engine with two distinctive operating modes:

(1) $M_f=\{m_s\}$ or $M_f=\{m_h\}$ (it being noted that only one mode is feasible);

(2) $M_f=\{m_s,m_h\}$ (i.e., both modes are feasible); or, (3) $M=\phi$(null, no mode is feasible, i.e., the torque demand cannot be satisfied by either mode in that given condition).

Figure 6B:
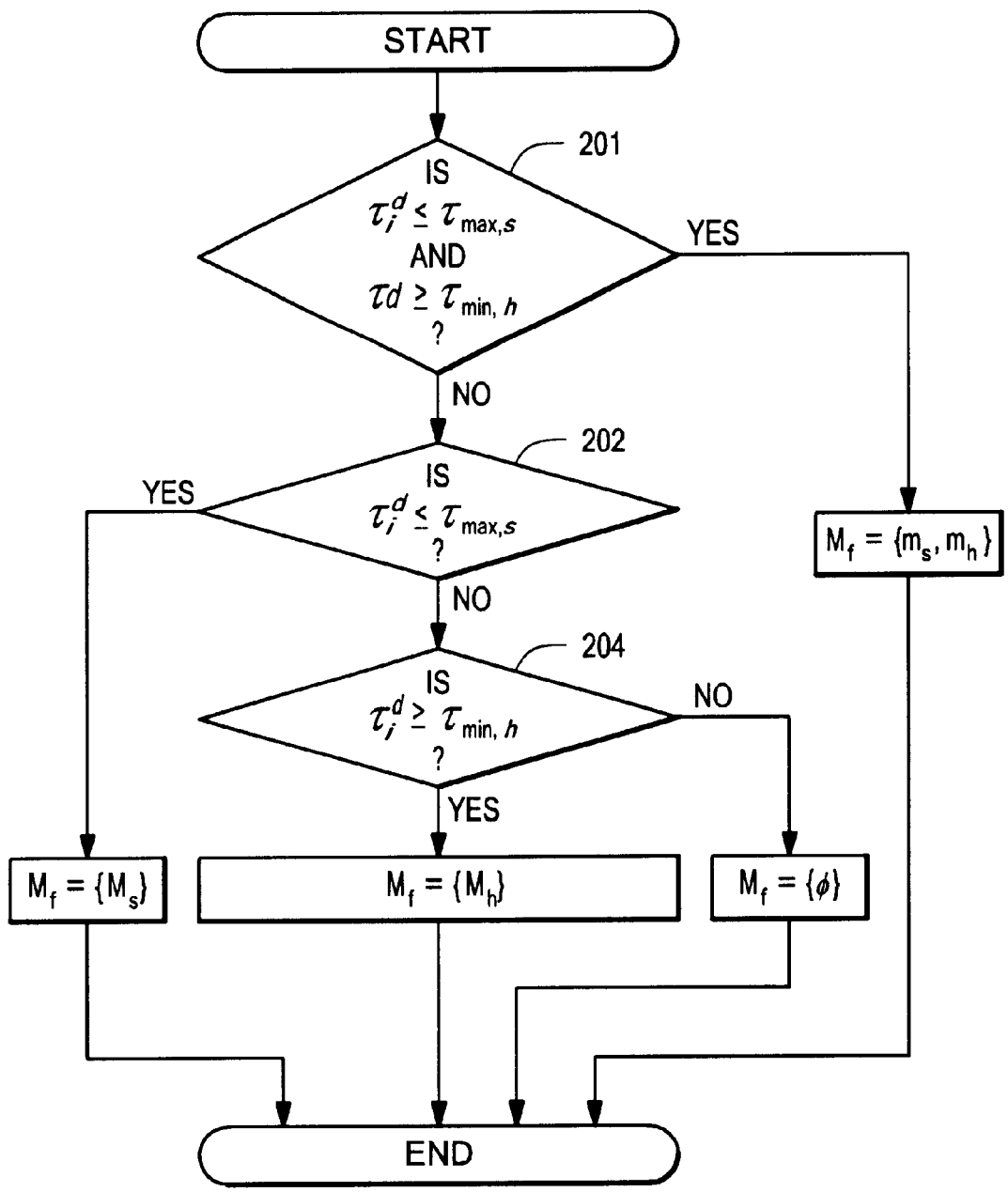
FIG. 6B is a flow diagram of the process used to determine feasible combustion modes in accordance with the invention.

Once the feasible mode is determined, the operational mode for the immediate combustion event will be selected as:

$m^o=m^d$, if $m^d \in M_f$ $m^o=\arg\{\min_{m\in M_f}(|\tau_i^d-\tau_i(m)|)\}$, if $m^d \notin M_f$ and $M_f \neq \phi$ $m^o=\arg\{\min_m(|\tau_i^d-\tau_i(m)|)\}$, if $M_f=\phi$ Thus, referring to FIG. 6B, in Step 201, a determination is made as to whether $\tau_i^d \leq \tau_{max,s}$ and $\tau_i^d \geq \tau_{min,h}$. Is so, $M_f$ includes both $m_s$ and $m_h$. Otherwise, if in Step 201, the condition is not true, a determination is made in Step 202 as to whether $\tau_i^d \leq \tau_{max,s}$. If true, $M_f$ contains $m_s$ only; otherwise, a determination is made in Step 204 as to whether $T_i^d \geq T_{min,h}$. If it is, $M_f$ has $m_h$ only. If, in Step 204, $\tau_i^d < \tau_{min,h}$, there is no feasible mode, that is $M_f$, is empty and the demanded torque cannot be satisfied by either mode in that given condition.

Referring again to FIG. 6A, having determined the set of feasible modes, $M_f$, a determination is made in Step 206 as to whether the demanded combustion mode $m^d$ belongs to the feasible mode set; i.e., is $m^d \in M_f$? If it is, the operating combustion mode $m^o$ is switched to the desired combustion mode $m^d$, i.e., $m^o=m^d$. On the other hand, if in Step 206, $m^d \notin M_f$, a determination is made in Step 208 as to whether $M_f$ is empty, i.e., $\phi$. If $M_f$ is not empty, i.e., not $\phi$, the old mode is not changed. That is, (1) the desired mode is not feasible; (2) there is other mode that is feasible, which implies that the current mode is feasible but not desired. In this case, the current mode is maintained until the condition allows it to switch. If the DISI system has more than two modes, then if not empty, it uses any mode which can produce the demanded torque, with preference usually given to the current operation mode.

If in Step 208, $M_f$ is empty, a determination is made in Step 210 as to whether:

$|\tau_i^d-\tau_{min,h}| \leq |\tau_i^d-\tau_{max,s}|$. If so, $m^o=m_h$; otherwise, $m^o=m_s$.

Thus, having selected the combustion mode $m^o$, (i.e., the combustion mode control 12, FIG. 3) a determination is made as to whether the torque control 104 should use spark for torque control or fuel for torque control during mode transition. Thus, in Step 210, a determination is made as to whether $m^o=m_s$. If so, fuel is used to torque control during mode transition; otherwise spark is used.

Figure 5:
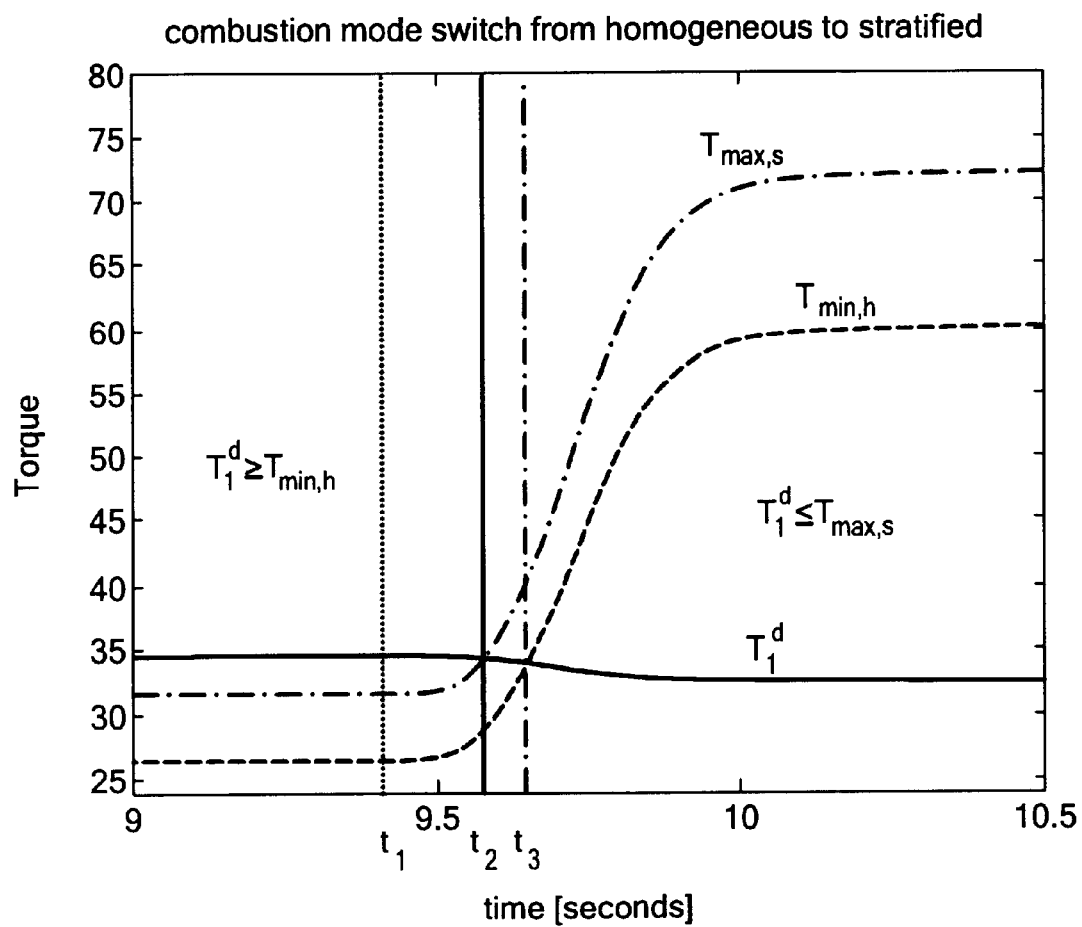
FIG. 5 is a time history of the engine of FIG. 1 showing such engine transitioning from a homogenous mode of operation to a stratified mode of operation.

FIG. 5 shows how the feasible modes are determined and the signals involved in making the decision during a homogeneous to stratified transition. At $t=t_1$, $m^d$ is changed from $m_h$ to $m_s$ when the request for a transition is made. The throttle, EGR valve positions are opened to the new setpoints. which correspond to higher intake manifold pressure. However, for $t<t_2$, $M_f=\{m_h\}$ (since $\tau_i^d \geq \tau_{min,h}$ and $\tau_i^d \geq \tau_{max,s}$ which suggests that the homogeneous operation is the only feasible combustion mode to meet the torque demand. Therefore, $m^o m_h=m^d$ (old), the mode cannot be switched from homogeneous to stratified immediately at time $t_1$ when it is requested. At time $t=t_2$, it can be seen from FIG. 5 that $\tau_i^d \leq \tau_{max,s}$ satisfied the first time that $m_s \in M_f$. For $t_3 \geq t \geq t_2$, $M_f=\{m_s, m_h\}$ where both modes are feasible. The actual mode switch occurs at $t=t_2$ since this is the earliest possible time to implement the new desired combustion mode. As the intake condition continues to change towards the new stratified setpoints, at $t=t_3$, $M_f=\{m_s\}$ then the stratified mode becomes the only feasible operating mode.

A number of embodiments of the invention have been described. Nevertheless, it will be understood that various modifications may be made without departing from the spirit and scope of the invention. For example, it should be noted that the system and process described herein may be used with engines having variable cam timing. Accordingly, other embodiments are within the scope of the following claims.

What is claimed is:

1. A method for controlling an internal combustion engine, such engine being adapted to operate in a selected one of a plurality of operating modes, one of such modes being characterized by stratified combustion and another one of such modes being characterized by a homogeneous combustion, such method comprising:

determining from operating conditions of the engine and a demanded torque, a preferred one of the operating modes;

determining from such demanded torque whether operation in such preferred operating mode is feasible; and transitioning to the preferred mode if such preferred mode is determined to be feasible; otherwise, operating such engine in the one of the modes which provides the minimum difference between the torque produced in such one of the modes and the demanded torque.

2. The method recited in claim 1 wherein the feasibility determining comprises:

determining maximum torque, $\tau_{max,s}$, producible by such engine in the stratified operating mode;

determining minimum torque, $\tau_{min,h}$, producible by such engine in the homogeneous operating mode;

determining that operation of the engine is feasible in the stratified mode if the demanded torque is less than the determined maximum torque, $\tau_{max,s}$, and determining that operation of the engine is feasible in the homogeneous mode if the demanded torque is greater than or equal to the determined minimum torque, $\tau_{min,h}$.

3. The method recited in claim 2 wherein maximum torque, $\tau_{max,s}$, is determined as a function of engine operating speed, air charge and burned gas fraction in a cylinder of such engine and a lower limit of the air fuel ratio for stratified operation of such engine.

4. The method recited in claim 3 wherein minimum torque, $\tau_{min,h}$, is determined as a function of engine operating speed, air charge in a cylinder of such engine, an upper limit of the air fuel ratio for homogeneous operation of such engine, burned gas fraction in the cylinder, and maximum delayed ignition timing from Maximum Brake Torque spark timing.

5. The method recited in claim 2 wherein minimum torque, $\tau_{min,h}$, is determined as a function of engine operating speed, air charge in a cylinder of such engine, an upper air fuel ratio for homogeneous operation of such engine, burned gas fraction in the cylinder, and maximum delayed ignition timing from Maximum Brake Torque MBT spark timing.

6. The method recited in claim 5 wherein minimum torque, $\tau_{min,h}$, is determined as a function of engine operating speed, air charge in a cylinder of such engine, an upper limit of air fuel ratio for homogeneous operation of such engine, burned gas fraction in the cylinder, and maximum delayed ignition timing from Maximum Brake Torque spark.

7. The method recited in claim 2 including:

changing spark timing to meet demanded torque when operating in the homogeneous mode and changing fuel flow to meet demanded torque when operating in the stratified mode.

8. The method recited in claim 7 wherein maximum torque, $\tau_{max,s}$, is determined as a function of engine operating speed, air charge and burned gas fraction in a cylinder of such engine and a lower limit of the air fuel ratio for stratified operation of such engine.

9. The method recited in claim 7 wherein minimum torque, $\tau_{min,h}$, is determined as a function of engine operating speed, air charge in a cylinder of such engine, an upper limit of air fuel ratio for homogeneous operation of such engine, burned gas fraction in the cylinder, and maximum delayed ignition timing from Maximum Brake Torque spark timing.

10. A system for controlling an internal combustion engine, such engine being adapted to operate in a selected one of a plurality of operating modes, one of such modes being characterized by stratified combustion and another one of such modes being characterized by a homogeneous combustion, such system comprising:

a controller, such controller being programmed to:
determine from operating conditions of the engine and a demanded torque, a preferred one of the operating modes;
determine from such demanded torque whether operation in such preferred operating mode is feasible; and
transition to the preferred mode if such preferred mode is determined to be feasible; otherwise, operating such engine in the one of the modes which provides the minimum difference between the torque produced in such one of the modes and the demanded torque.

11. The system recited in claim 10 wherein the controller is programmed to determine feasibility by:

determining maximum torque, $\tau_{max,s}$, producible by such engine in the stratified operating mode;
determining minimum torque, $\tau_{min,h}$, producible by such engine in the homogeneous operating mode;
determining that operation of the engine is feasible in the stratified mode if the demanded torque is less than the determined maximum torque, $\tau_{max,s}$, and determining that operation of the engine is feasible in the homogeneous mode if the demanded torque is greater than or equal to the determined minimum torque, $\tau_{min,h}$.

12. The system recited in claim 11 wherein maximum torque $\tau_{max,s}$, is determined as a function of engine operating speed, air charge and burned gas fraction in a cylinder of such engine and a lower limit of the air fuel ratio for stratified operation of such engine.

13. The system recited in claim 11 wherein minimum torque, $\tau_{min,h}$, is determined as a function of engine operating speed, air charge in a cylinder of such engine, an upper limit of the air fuel ratio for homogeneous operation of such engine, burned gas fraction in the cylinder, and maximum delayed ignition timing from Maximum Brake Torque spark timing.

14. The system recited in claim 11 wherein minimum torque, $\tau_{min,h}$, is determined as a function of engine operating speed, air charge in a cylinder of such engine, an upper air fuel ratio for homogeneous operation of such engine, burned gas fraction in the cylinder, and maximum delayed ignition timing from Maximum Brake Torque MBT spark timing.

15. The system recited in claim 14 wherein minimum torque, $\tau_{min,h}$, is determined as a function of engine operating speed, air charge in a cylinder of such engine, an upper limit of air fuel ratio for homogeneous operation of such engine, burned gas fraction in the cylinder, and maximum delayed ignition timing from Maximum Brake Torque spark.

16. The system recited in claim 11 wherein the controller is program to:

change spark timing to meet demanded torque when operating in the homogeneous mode and changing fuel flow to meet demanded torque when operating in the stratified mode.

17. The system recited in claim 16 wherein maximum torque, $\tau_{max,s}$, is determined as a function of engine operating speed, air charge and burned gas fraction in a cylinder of such engine and a lower limit of the air fuel ratio for stratified operation of such engine.

18. The system recited in claim 16 wherein minimum torque, $\tau_{min,h}$, is determined as a function of engine operating speed, air charge in a cylinder of such engine, an upper limit of air fuel ratio for homogeneous operation of such engine, burned gas fraction in the cylinder, and maximum delayed ignition timing from Maximum Brake Torque spark timing.

* * * * *